US010243920B1

(12) United States Patent
Dickinson

(10) Patent No.: US 10,243,920 B1
(45) Date of Patent: Mar. 26, 2019

(54) INTERNET PROTOCOL ADDRESS REASSIGNMENT BETWEEN VIRTUAL MACHINE INSTANCES

(71) Applicant: AMAZON TECHNOLOGIES, INC., Seattle, WA (US)

(72) Inventor: Andrew Bruce Dickinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 14/969,235

(22) Filed: Dec. 15, 2015

(51) Int. Cl.
*G06F 15/177* (2006.01)
*H04L 29/12* (2006.01)
*H04L 12/741* (2013.01)
*G06F 9/455* (2018.01)

(52) U.S. Cl.
CPC .......... *H04L 61/2015* (2013.01); *H04L 45/54* (2013.01); *H04L 45/74* (2013.01); *H04L 61/103* (2013.01); *H04L 61/2076* (2013.01); *H04L 61/2525* (2013.01); *H04L 61/2596* (2013.01); *H04L 61/6022* (2013.01); *G06F 2009/45595* (2013.01)

(58) Field of Classification Search
CPC ....... G06F 2009/45595; G06F 9/45558; G06F 9/455; H04L 61/103; H04L 61/2015; H04L 45/54; H04L 45/74; H04L 61/2525; H04L 61/2596; H04L 61/6022
See application file for complete search history.

(56) References Cited

U.S. PATENT DOCUMENTS

| 9,319,342 | B2* | 4/2016 | Holkkola | H04L 41/0273 |
| 2005/0286518 | A1* | 12/2005 | Park | H04L 29/12783 370/389 |
| 2010/0265846 | A1* | 10/2010 | Weniger | H04L 45/04 370/254 |
| 2012/0102163 | A1* | 4/2012 | Witt | G06F 9/5077 709/221 |
| 2013/0054762 | A1* | 2/2013 | Asveren | H04L 61/2553 709/220 |
| 2014/0064275 | A1* | 3/2014 | Hammer | H04L 45/74 370/392 |
| 2014/0130044 | A1* | 5/2014 | Zhang | G06F 9/45533 718/1 |

(Continued)

*Primary Examiner* — Joseph E Avellino
*Assistant Examiner* — Rachel J Hackenberg
(74) *Attorney, Agent, or Firm* — Blank Rome LLP

(57) ABSTRACT

In various methods and apparatus Internet Protocol (IP) addresses can be moved between virtual machine instances in a provider network. Customers can cause an IP address to be moved between virtual machine instances such as by submitting an application programming interface call. The provider network also may include a server system that implements the dynamic host configuration protocol such as the DHCP for version 6. The DHCP server system moves the requested IP address by exchanging messages with the effected instances. The DHCP server system may transmit a message to remove the IP address from a first instance by including the IP address with a valid lifetime set to a minimal time-out value. The DHCP server system may transmit a message to add the IP address to a second instance by including the IP address and a corresponding valid lifetime value of greater than the minimal time-out value.

20 Claims, 7 Drawing Sheets

(56) References Cited

U.S. PATENT DOCUMENTS

| | | | |
|---|---|---|---|
| 2015/0281048 A1* | 10/2015 | Agarwal | H04L 45/44 370/236 |
| 2016/0241515 A1* | 8/2016 | Pai | H04L 63/0209 |
| 2016/0255045 A1* | 9/2016 | Kolesnik | H04L 61/2015 709/222 |
| 2017/0013060 A1* | 1/2017 | Chang | G06F 17/30569 |

* cited by examiner

INTERNET PROTOCOL ADDRESS REASSIGNMENT BETWEEN VIRTUAL MACHINE INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by service providers to provide computing resources to customers of the service providers. Some public data center operators provide network access, power, and secure installation facilities for hardware owned by various customers, while other public data center operators provide full service facilities that also include hardware resources made available for use by their customers.

In general, a network is a collection of compute devices (e.g., servers), storage devices, switches, routers, etc. Each such device is assigned an internet protocol (IP) address by which packets can be sent to that device. Managing the IP addresses of a network can be particularly troublesome in a service provider's network that includes thousands of servers on which virtual machine instances are created and used by customers of the service provider. During normal daily operation of the provider network, virtual machine instances are created and deactivated continually based on the needs of the customers. Each time a new virtual machine instance is created, an IP address is assigned to that instance and each time a virtual machine instance is deactivated, the IP address can be released back to a pool of IP addresses for future use by another virtual machine instance.

BRIEF DESCRIPTION OF THE DRAWINGS

For a detailed description of various examples, reference will now be made to the accompanying drawings in which.

DETAILED DESCRIPTION

Figure 1:
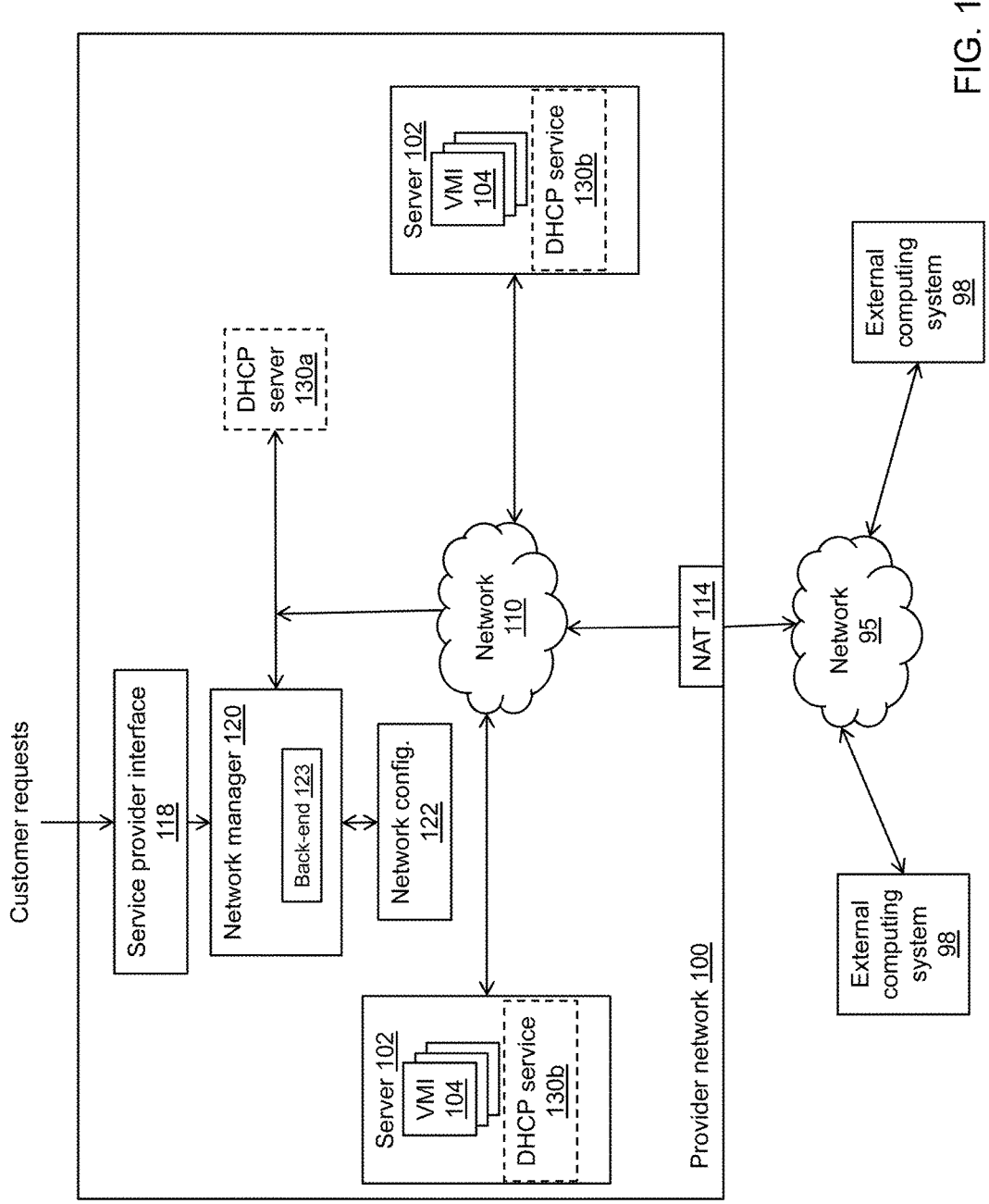
FIG. 1 shows an example of a provider network in which IP addressed can be moved between virtual machine instances in accordance with various examples.

Various embodiments are described herein of methods and apparatus for permitting customers of a service provider to "move" an IP address from one of the customer's virtual machine instances (also called "virtual machines" or "instances") to another of the customer's instances. Any of a variety of reasons might prompt a customer to initiate moving an IP address between instances such as hardware or software failures, changing from one instance type to another instance type, etc. In accordance with various embodiments, a customer can submit an application programming interface (API) call to a centralized service on the service provider's provider network to initiate the IP address move. The centralized service may include a network manager that receives the API call to move the IP address. The network manager may respond to the API call by requesting a dynamic host configuration protocol (DHCP) server to implement the IP address move.

In some embodiments, the DHCP server implements DHCP for IP version 6 (DHCPv6) and, as such, may be referred to as a "DHCPv6 server." The DHCP server can remove an IP address from one instance and assign that address to another instance as requested by the customer via the API call. For example, the DHCP server can transmit a RECONFIGURE message to the instance for which the IP address is to be removed. That instance replies to the DHCP server with a REQUEST message that indicates the instance's ability to receive new configuration parameter such as IP address information. The DHCP server then responds to the instance with a REPLY message that specifies the IP address (to be removed) and a valid-lifetime of a minimal time-out value (e.g., a value that is equal to or less than 60 second such as 0 seconds) for that IP address. The valid-lifetime set to the minimal time-out value is indicative that the IP address is essentially not to be used for a meaningful amount of time any further by the instance. That is, a valid life-time set to the minimal time-out value causes the IP address to be valid but only for a very short period of time that is essentially useless for sending and receiving packets.

Meanwhile, the DHCP may perform a similar interaction with the instance to be assigned the address including exchanging similar RECONFIGURE and REQUEST messages. The REPLY message sent by the DHCP server to the instance, however, includes the IP address and specifies a valid-lifetime greater than the minimal time-out value (e.g., greater than 60 seconds). In an example in which the valid life-time value is set to a value of 7 days, the valid-lifetime indicates to the instance that it is to use the newly assigned IP address for the next 7 days. Thus, while the DHCP protocol does not have the ability to explicitly remove an IP address previously assigned to a virtual machine instances, the DHCP can accomplish that result anyway by configuring the instance to accept the IP address but with a valid-lifetime set to the minimal time-out value.

In some embodiments, the provider network may implement a virtual overlay network on top of the physical network. The virtual overlay network uses virtual IP addresses for the virtual machine instances to communicate with each other, and the overlay network's infrastructure modifies the packets between instances (e.g., through an encapsulation process) to include physical IP addresses of the instances attempting to communicate with one another. In such embodiments, the virtual IP addresses can be moved from one instance to another such as by using the process described herein.

FIG. 1 illustrates an example of a provider network 100 in accordance with various embodiments. As shown in the example of FIG. 1, the provider network is accessible by one or more external computing systems 98 through an external network 95 (e.g., the Internet). The external computer systems 98 may include individual computing devices such as desktop computers, notebook computers, servers, tablet devices, smart phones, networks of computing devices, and any other type of electronic device which may include a processor, memory, input device (e.g., keyboard, mouse, trackpad, etc.) and an output device such as a display. Customers of the service provider that implements the provider network 100 may access and configure compute resources on the provider network 100 through use of external computing systems 98. Customers may access services provided by the provider network through, for example, web browser applications executing on the customers' external computing systems 98. Interfaces provided by the provider network to the customers may comprise web applications executing on servers that are part of the provider network. The example of FIG. 1 shows a service provider interface 118 which with which customers can interact to, for example, submit requests such as requests to move IP addresses between virtual machine instances as explained below. In some embodiments, the service provider interface 118 is an API. In other embodiments, the service provider interface 118 is a graphical user interface (GUI) or as a command line interface (CLI) implemented by way of a web page provided to a browser console executing on the customer's device.

The illustrative provider network 100 in FIG. 1 includes a plurality of servers 102 coupled together via a network 110. The network 110 may include a collection of routers, switches and other network communication devices to route messages back and forth between the servers 102 and other devices in the provider network 100, as well as to and from the external computing systems 98. Each server 102 may include hardware such as processors, memory, network interfaces, and the like and may execute software to provide the functionality described herein as performed by each such server. One or more of the servers 102 may host one or more virtual machine instances (VMIs) 104. Although four servers 102 each including three virtual machine instances 104 are shown in the example of FIG. 1, any number of servers and instances can be provided (e.g., thousands) in other embodiments. A virtual machine is a virtualized computer system, or a software implementation of a physical computer system. Virtual machines may provide for multiple and/or different operating system environments to run concurrently on a single system having a processor and memory. In one example, multiple virtual machines of a Linux® operating system environment may execute concurrently with multiple instances of a Microsoft® Windows® operating system environment on a single physical computer. A virtual machine may include a hypervisor or a virtual machine monitor which are programs that allow multiple operating systems to share a single hardware host. Each operating system appears to have exclusive access to the host's processor, memory, and other resources, however, the hypervisor controls the host processor and resources, allocating what is needed to each guest operating system in turn and making sure that the guest operating systems of the virtual machines cannot disrupt each other. Each virtual machine may be controlled by different respective customers, who have access only to their own virtual machines and do not have access to the virtual machines of other customers.

Each instance 104 is assigned an IP address by, for example, DHCP sever 130 (as discussed below) when the instance is created for a customer. In some embodiments, the IP address assigned to each instance 104 is a "private" IP address meaning that it is not published outside the provider network. Each instance 104 thus may be assigned a private IP address and may also be assigned a "public" IP address. The public IP address is published outside the provider network 100, and a particular instance can be accessed by an external computing system 98 using the instance's public IP address. The provider network 100 also includes one or more network address translators (NAT) 114. The NAT 114 receives packets from network 95 which include, as the destination IP address, the public IP address of an instance 104 targeted by the packet. The NAT 114 stores mappings between corresponding public and private IP addresses. The NAT 114 accesses its mappings using the public destination IP address from the received packet, retrieves the corresponding private IP address, and replaces the packet's public destination IP address with the private destination IP address. The packet is then routed through network 110 to its intended destination instance 104.

The provider network 100 also includes a network manager 120, network configuration storage 122, and the DHCP server 130. In various embodiments, the DHCP server may be implemented in different ways in the provider network 100. FIG. 1 illustrates a DHCP server 130a which may be implemented on a stand-alone computing device. The DHCP server may be implemented additionally or alternatively within each server 102 as DHCP services 130b. In this latter implementation (DHCP services 130b), the DHCP service may be implemented in the hypervisor or DOMO which runs on the servers 102, or on a peripheral hardware device attached to or installed in the servers 102. The term "DHCP server system" refers to one or more of the DHCP server 130a and DHCP services 130b. In one example, the DHCP server system may include one or more centralized DHCP servers 130a. In another example, the DHCP server system may include the various distributed DHCP services 130b. Further, the term "DHCP server 130" is used herein to refer to a HDCP server system.

The network manager 120 and DHCP server 130 include hardware such as processors, memory, network interfaces, etc. and may be implemented, for example, as server computers executing underlying software. The network configuration storage 122 may include solid state or magnetic storage on which a database or other type of data storage structure may be present. In some embodiments, the network manager 120 may be a service that executes on one or more computer systems that communicate with the service provider interface 118. For example, the service provider interface 118 can be implemented using a web server program that can generate web pages that are provided to the customer's device (e.g., for display in a browser on the customer's device). Alternatively or additionally, the service provider interface 118 can implement a web server that exposes a web service application program interface operable to receive API calls. The service provider interface 118 can include logic to perform operations such as validating customer requests. Validation of customer requests may include parsing the request to determine whether a customer request has the correct parameters for the operation, whether the parameters are within valid ranges, validating customer credentials, whether the customer request itself is for a "legal" operation (e.g., requesting the deletion of a resource that does not exist is an illegal operation), and so on.

In the event that the request satisfies any checks that are performed on it (e.g., authorization and authentication related operations), the service provider interface 118 can write the substance of the request (or the request itself) to a database or data store in the back-end 123, which may be responsible for implementing a desired state on behalf of the various customers. The back-end 123 can include one or more programs that include executable code to read the data store or database and detect new requests. The back-end 123 can then generate data that reflects the request (e.g., state that identifies the IP address the customer wants to move, lifetime values, the target of the move operation, such as the virtual machines instance identifier, and the destination of the move operation). The back-end 123 can then be configured to distribute the desired state to all appropriate entities within the provider network 100 through mechanisms such as poll-based syncing, push-based synching, on-demand rule-loading, etc. For example, this could include pushing routing tables to network devices that indicate that the IP address is going to be moved from one server to another. In another example, the back-end 123 can be configured to identify the applicable DHCP service (e.g., a DHCP that is responsible for handling DHCP related operations for the server that is hosting the source virtual machine of the move operation and the destination virtual machine of the move operation) and send one or more messages to the DHCP service(s) indicating the move. A workflow system also may be included to implement a series of operations over time to implement the states as requested by the network manager 120 on behalf of the customer requests.

To be accessed by other instances 104, external computing systems 98, the DHCP server 130 and other provider network components, each instance 104 is assigned at least one IP address. The assigned IP address then can be included as the destination IP address in the headers of packets that are to be sent through network 110 to the instance. Further, if an instance 104 sends a packet to another instance, the IP address of the source instance includes its own IP address as a source IP address in the header of the packet. Thus, packets may be formed and transmitted from one instance to another and the packets headers include source and destination IP address fields that are populated with the IP addresses of the source and destination instances, respectively.

Figure 2:
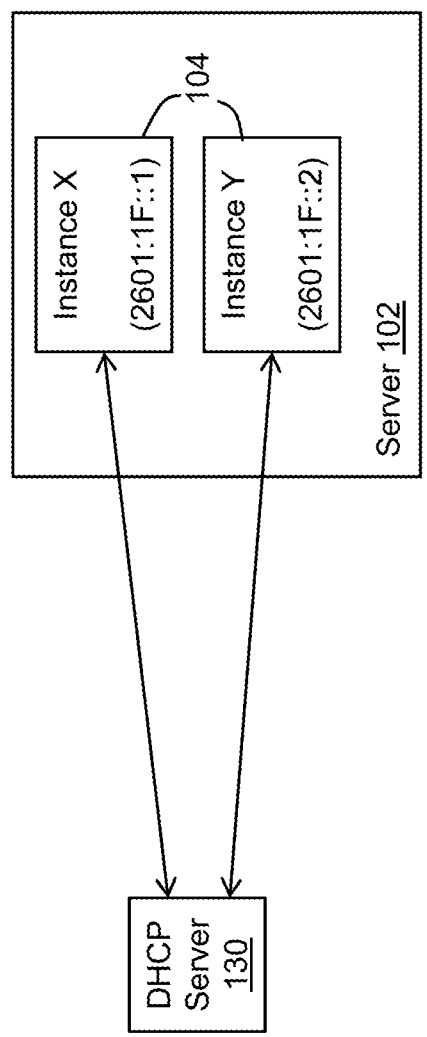
FIG. 2 shows an example of a dynamic host configuration protocol (DHCP) server assigning IP addresses to virtual machine instances executing on a server in accordance with various examples.
Figure 3:
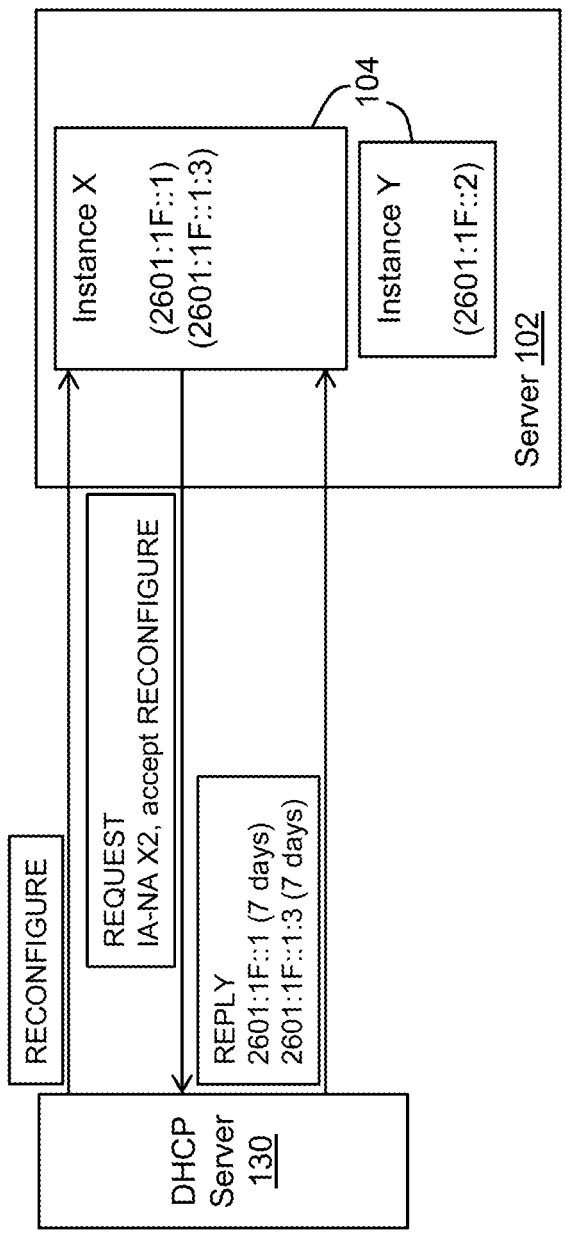
FIG. 3 shows an example of the DHCP server assigning an additional IP address to one of the instances of FIG. 2 in accordance with various examples.
Figure 4:
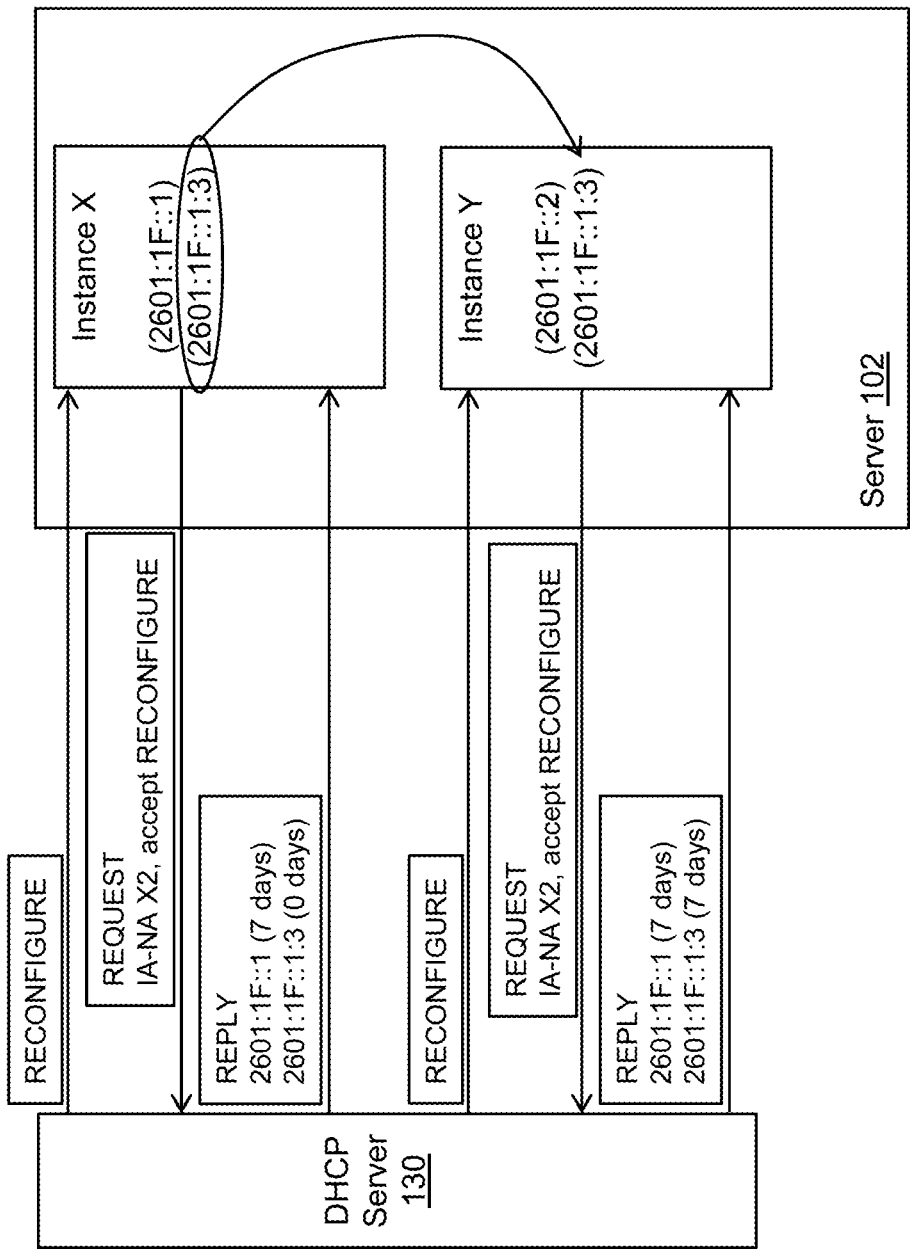
FIG. 4 shows an example of the DHCP server removing an additional IP address from one of the instances and assigning it to another instances of FIG. 2 in accordance with various examples.

The DHCP server 130 functions, at least in part, to assign IP addresses to each virtual machine instance 104 and can reassign an IP address from one 1 instance to be used for another instance. In accordance with some embodiments, the DHCP server 130 implements the DHCPv6 protocol and, as such, can assign multiple IP addresses as well as issue RECONFIGURE messages to initiate an IP address reassignment between instances process. FIGS. 2-4 illustrate this process. FIGS. 2-4 show a DHCP server 130 which may be the DHCP server system described above.

In FIG. 2, a customer has submitted a request for the provider network to create virtual machine instances 104, designated as Instance X and Instance Y in the example of FIG. 2. The request may be provided by the customer to the service provider interface 118 of the provider network 100. The provider network 100 also may include a provisioning system that decides where to place an instance (e.g., in which sever 102) and cause the instance to be created. Instances X and Y may be placed and executed in the same server 102 as shown, or in different servers. Further, the DHCP server 130 has assigned IP addresses 2601:1F::1 to Instance X and IP address 2601:1F::2 to Instance Y in response to a request from a customer via the service provider interface 118 or automatically as part of the act of provisioning the instances. In some embodiments, each instance obtains its IP address from the DHCP server 130 by first sending a SOLICIT message to discover a DHCP server that can provide configuration desired by the instance. In this case, each of the Instances X and Y specify in their respective SOLICIT messages that the instance requires a single IP address. The SOLICIT message also may indicate that the instance can accept RECONFIGURE messages, which are discussed below. In response to the SOLICIT message, the DHCP server 130 may respond with an ADVERTISE message that indicates that the DHCP server is available to provide the configuration data (e.g., IP addresses) that the instances have requested. Instances X and Y then can issue a REQUEST message repeating at least some of the information from the SOLICIT message that each wants an IP address to be assigned to that instance. The DHCP server then issues a REPLY message to each instance and the REPLY message includes a unique IP address to be assigned to the instance. The REPLY message also may specify a "valid lifetime" value. The valid lifetime indicates the length of time the IP address remains in a valid state. For example, the DHCP may specify a valid lifetime of 7 days which means the IP address remains valid for the next 7 days, and at the end of the 7 days the address becomes invalid and ceases being recognized by the provider network (e.g., switches, routers, other instances, etc.) as being associated with the instance.

In the example of FIG. 2, each instance 104 (Instance X and Instance Y) requested one IP address from the DHCP server 130. However, in general by way of the SOLICIT, ADVERTISE, REQUEST, and REPLY protocol described above, multiple IP addresses can be assigned at one time to a single instance. To request multiple IP addresses the instance's SOLICIT and REQUEST messages specify that the number of IP addresses (1, 2, 3, . . . ) that the instance wants. The DHCP server's REPLY message will then include the number of IP addresses being requested.

In FIG. 3, the customer who owns Instance X wants a second IP address assigned to the instance. The request may be provided by the customer to the service provider interface 118 of the provider network 100 which then forwards the request on to the network manager 120. The network manager 120 then may send a request to the DHCP server 130 which may exchange messages with the corresponding instances as described below. For example, the customer may issue an API call to the network manager 120 to thereby request another IP address to be assigned to the existing Instance X, which already has one assigned IP address (i.e., 2601:1F::1). The network manager 120 responds to the API call from the customer by sending a message to the DHCP sever 130 to generate and provide the requested additional IP address to the customer's Instance X. The messaging shown in the example of FIG. 3 between the DHCP server 130 and Instance X accomplishes the task of assigning an additional IP address.

The DHCP server 130 in this example issues a RECONFIGURE message to Instance X. The RECONFIGURE message informs the instance that the DHCP server has new or updated configuration parameters, and the instance is to initiate a REQUEST/REPLY transaction with the DHCP server 130 in order to receive the updated information. Instance X then returns a REQUEST message to the DHCP server 130 requesting the update configuration information and acknowledging that the instance can accept and desires two IP addresses. The REQUEST message includes an Identity Association-Non-temporary Address (IA-NA) request for two IP addresses ("X2" in the example of FIG. 3). The DHCP server 130 issues a REPLY message to the instance, and the REPLY message includes two IP addresses—the originally assigned IP address of 2601:1F::1 and a newly assigned IP address of 2601:1F::1:3. In this example, the DHCP server 130 also has included a valid lifetime for each IP address of 7 days, although a different length of time could have been specified and the length of time between the two IP addresses could be different. For example, one address could have a valid lifetime of 7 days and the other address could have a valid lifetime of 10 days. At this point, Instance X has two assigned IP addresses as shown (2601:1F::1 and 2601:1F::1:3), and Instance Y has the same IP address of 2601:1F::2.

Figure 5:
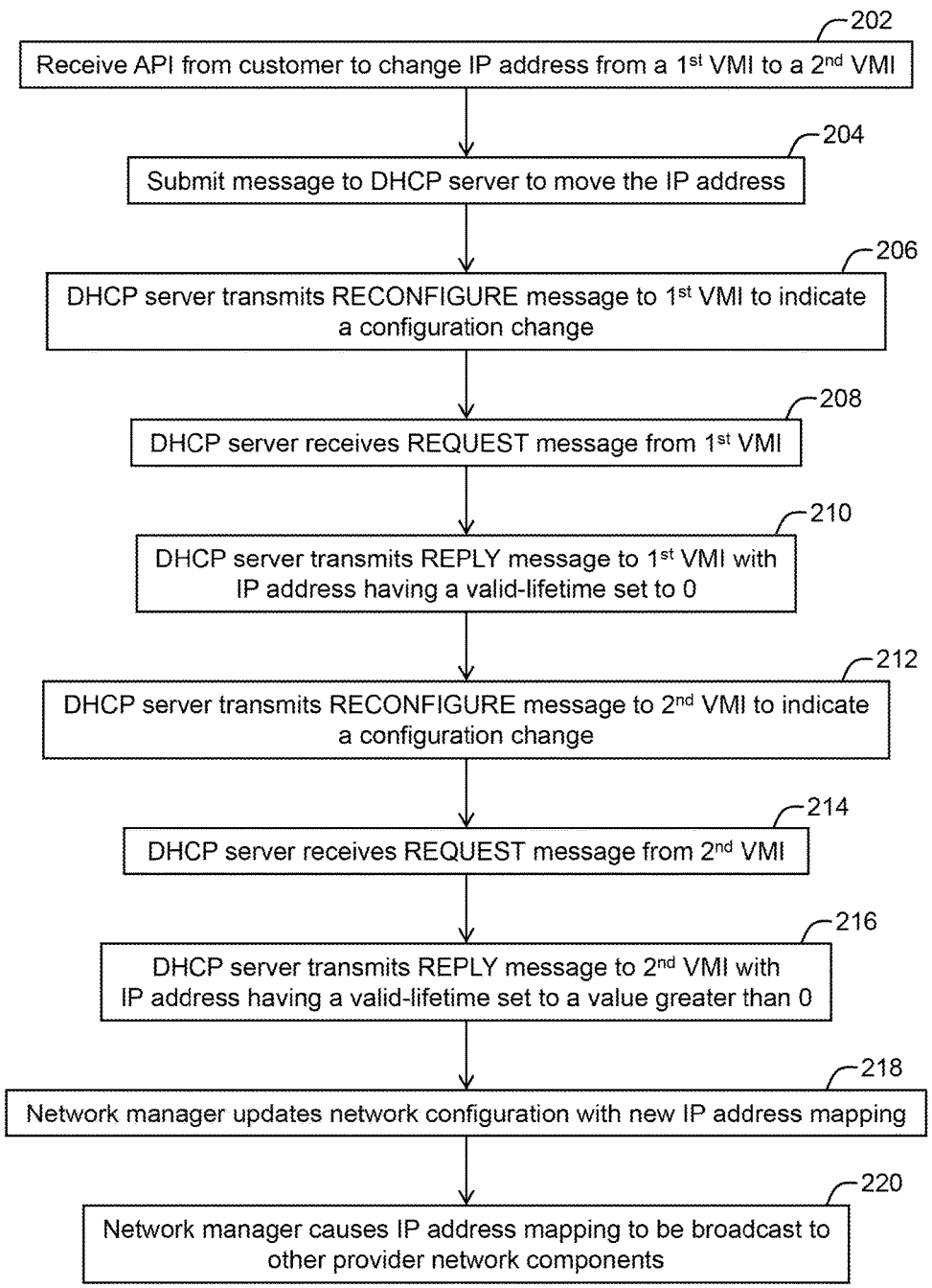
FIG. 5 includes a method flow chart of moving IP addresses between instances in accordance with various embodiments.

FIG. 4 illustrates an example in which a customer initiates the move of IP address 2601:1F::1:3 from Instance X to Instance Y such as by submitting a request again through the service provider interface 118 to the network manager 120 which then submits messages to the DHCP server 130 to move the IP address. FIG. 4 is discussed with respect to the method of FIG. 5 as well. In FIG. 5, the method includes at 202 receiving an API call from a customer to change an IP address from one of its instances to another instance. In the example of FIG. 4, the customer wants to move IP address 2601:1F::1:3 from Instance X to Instance Y. The customer may submit the API call to the network manager 120 to initiate the IP address move, and the network manager 120 then forwards the request to the DHCP server 130 (operation 204 in FIG. 5). The DHCP server 130 exchanges RECONFIGURE, REQUEST, and REPLY messages with each instance to accomplish this task.

With respect to Instance X and as illustrated at 206 in FIG. 5, the DHCP server 130 issues a RECONFIGURE message to Instance X that the DHCP server 130 has new or updated configuration parameters, and the instance is to initiate a REQUEST/REPLY transaction with the DHCP server in order to receive the updated information. At 208, Instance X then returns a REQUEST message to the DHCP server 130 requesting the updated configuration information and acknowledging that the instance can accept two IP addresses. The DHCP server 130 issues a REPLY message to the instance, and the REPLY message includes two IP addresses—the previously assigned IP addresses 2601:1F::1 and 2601:1F::1:3. In this example, the DHCP server 130 also has included a valid lifetime for address 2601:1:1F::1 of 7 days to renew that address for another 7 days. The valid lifetime for address 2601:1F::1:3, however, is set to 0, although in general the valid lifetime for the IP address could be set to the minimal time-out value. In some embodiments, the minimal time-out value is a period of time that is too short to provide meaningful use to the instance of the address to send and receive packets. In some embodiments, the minimal time-out value is less than or equal to 60 seconds, and in some examples such as the example of FIG. 4, the value is 0. Setting a valid lifetime of 0 for an IP address renders it generally immediately invalid, and Instance X responds by removing that address from its configuration. Operation 210 in FIG. 5 illustrates a REPLY message having the IP address to be removed from Instance X and setting its valid lifetime to 0, but in general the REPLY message may include additional IP addresses as desired with non-zero valid lifetimes.

Referring still to FIGS. 4 and 5, with respect to Instance Y, the DHCP server 130 also issues a RECONFIGURE message to the instance at 212 that the DHCP server has new or updated configuration parameters, and the instance is to initiate a REQUEST/REPLY transaction with the DHCP server 130 in order to receive the updated information. Instance Y then returns a REQUEST message at 214 to the DHCP server 130 requesting the update configuration information and acknowledging that the instance can accept two IP addresses. The DHCP server 130 issues a REPLY message to the instance at 216, and the REPLY message includes two IP addresses—the previously assigned IP address 2601:1F::2, as well as a newly assigned address 2601:1F::1:3 as shown at 216. This latter address was the address previously assigned to Instance X. In this example, the DHCP server 130 also has included a valid lifetime for both addresses of 7 days, although the length of time could be different than 7 days and even be different between the two addresses. In general, the valid lifetimes for the addresses assigned to Instance Y are greater than the minimal time-out value (e.g., a value greater than 60 seconds). Operation 216 in FIG. 5 illustrates that the REPLY message to Instance Y includes the IP address from Instance X and setting its valid lifetime to a value greater than 0, but in general the REPLY message may include additional IP addresses as desired such as IP addresses previously assigned to Instance Y.

FIG. 5 also illustrates that at 218 the network manager 120 updates its database of IP address mappings (e.g., mappings between IP addresses and instances) stored in network configuration storage 122 that IP address 2601:1F::1::3 is no longer assigned to Instance X and instead is assigned to Instance Y. Further, at 220, the network manager 120 may cause the IP address mapping of IP address of 2601:1F::1::3 from Instance X to Instance Y to be distributed to other nodes in the network that may depend on such information to perform their normal operations. For example, the network manager 120 may update routing tables in switches, routers, NAT 114, etc. that IP address 2601:1F::1::3 is no longer assigned to Instance X and instead is assigned to Instance Y.

The examples of FIGS. 2-5 illustrate a DHCP server 130 exchanging messages with virtual machine instances to assign and move IP addresses. In an embodiment in which the DHCP server system includes one or more centralized DHCP servers 130a (FIG. 1), the DHCP server 130 shown in FIGS. 2-5 is one or more of the DHCP servers 130a. In embodiments in which the DHCP server system includes the distributed DHCP services 130b in the various servers 102 which host the virtual machine instances, the DHCP server 130 illustrated in FIGS. 2-4 includes the DHCP services 130b. If the instances for which the IP address is being moved execute in separate servers 102, the network manager 120 may submit messages to the respective DHCP services 130b of the separate servers to trigger each such DHCP service 130b to exchange the DHCP messages shown in FIGS. 3 and 4 with the instance executing in that DHCP service's server 102.

In some embodiments, the provider network may implement a virtual overlay network as noted above. In an overlay network, instances exchange packets (and external computing systems can exchange packets with the instances) using virtual overlay addresses. The instances, however, are physically addressed with physical IP addresses and thus mappings between virtual and physical addresses (and/or the physical computing devices) are maintained.

Use of the virtual overlay network may provide various benefits in various situations. For example, virtual overlay networks permit customers of the provider network to select their own virtual private IP addresses for their instances even if two or more different customers select identical virtual private IP addresses for their instances. Also, virtual overlay networks can limit communications to and/or from computing nodes of a particular virtual network to other computing nodes that belong to the same virtual network. In this manner, computing nodes that belong to multiple virtual networks may share parts of one or more intermediate physical networks, while still maintaining network isolation for computing nodes of a particular virtual network. In addition, use of virtual overlay networks allows computing nodes of a virtual network to be physically moved, with the overlay network managing routing of communications for a particular virtual network address to a corresponding actual physical network address (e.g., by updating mappings that associate particular virtual network addresses of particular virtual networks to particular physical locations of computing nodes to which those virtual network addresses are assigned).

Figure 6:
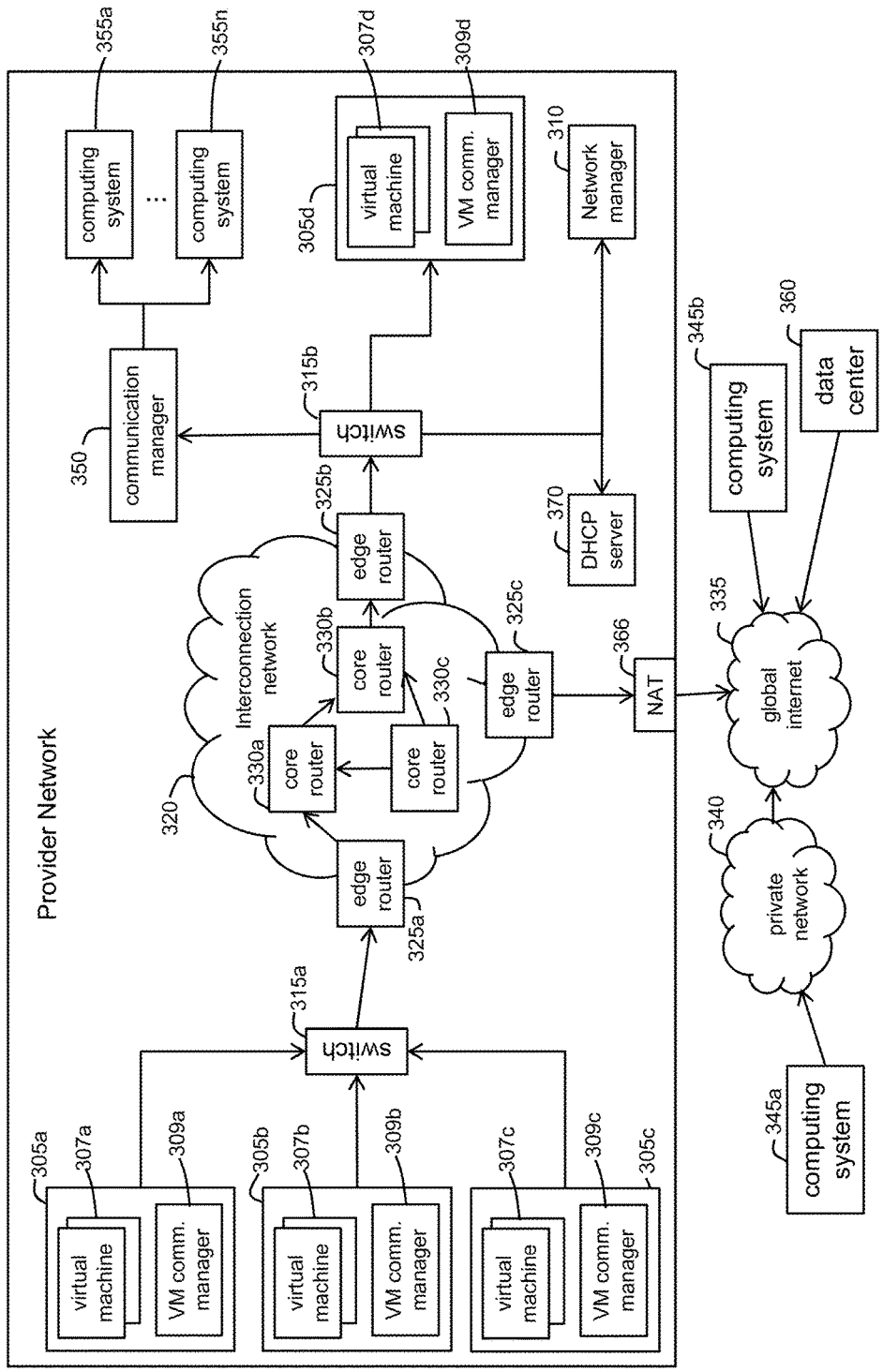
FIG. 6 shows an example of a provider network which implements a virtual overlay network and a DHCP server configured to assign virtual IP addresses to and move virtual IP addresses between instances in accordance with various embodiments.

FIG. 6 is a network diagram illustrating an example embodiment of a service provider network implementing an overlay network. In this example, a provider network 300 is shown coupled to a global internet 335 external to the network 300. The global network 335 provides access to one or more computing systems 345a via a private network 340, to one or more other globally accessible data centers 360 that each may have multiple computing systems, and to one or more other computing systems 345b. The global internet 335 may be for, example, a publicly accessible network, possibly operated by various distinct parties, such as the Internet, and the private network 340 may, for example, be a corporate network that is wholly or partially inaccessible from computing systems external to the private network 340.

The provider network 300 includes a number of physical computing systems 305a-305d and 355a-355n, a communication manager module 350 that executes on one or more other computing systems (not shown in FIG. 6) to manage communications for the associated computing systems 355a-355n, and a network manager module 310 that executes on one or more computing systems (not shown in FIG. 6). In this example, each physical computing system 305a-305d hosts one or more virtual machine computing nodes and includes a virtual machine ("VM") communication manager 309a-309d. Each VM communication manager may be part of a virtual machine hypervisor monitor for the physical computing system. Computing system 305a is shown as executing one or more virtual machines 307a and a VM communication manager 309a. Computing systems 305b-d also are shown as executing one or more virtual machines 307b-d and VM communication managers 309b-d, respectively. Physical computing systems 355a-355n in this example do not execute any virtual machines and thus may each act as computing nodes that directly execute one or more software programs on behalf of a customer of the service provider. In general, any mix of physical computers that host virtual machines and physical computers that do not host virtual machines is possible.

This illustrative provider network further includes multiple networking devices, such as switches 315a-315b, edge routers 325a-325c, and core routers 330a-330c. Switch 315a is part of a physical network that includes physical computing systems 305a-305c, and is connected to edge router 325a. Switch 315b is part of a distinct physical network that includes physical computing systems 305d, 355a-355n, and the computing systems providing the communication manager module 350 and the network manager module 310, and is connected to edge router 325b. The physical networks established by switches 315a-315b, in turn, are connected to each other and other networks (e.g., the global internet 335) via an intermediate interconnection network 320, which includes the edge routers 325a-325c and the core routers 330a-330c. The edge routers 325a-325c provide gateways between two or more networks. For example, edge router 325a provides a gateway between the physical network established by switch 315a and the interconnection network 320. Edge router 325c provides a gateway between the interconnection network 320 and the global internet 335. The core routers 330a-330c manage communications within the interconnection network 320, such as by forwarding packets or other data transmissions as appropriate based on characteristics of such data transmissions (e.g., header information including source and/or or destination addresses, protocol identifiers, etc.) and/or characteristics of the interconnection network 320 itself (e.g., routes based on network topology).

In some embodiments, communications to and/or from virtual machines 307a-307d and physical computing systems 355a-355n are provided on the overlay network as noted above. The overlay network may be implemented in various ways in various embodiments, such as by using IPv4 ("Internet Protocol version 4") or IPv6 ("Internet Protocol version 6") packets as the overlay network packet size. For example, virtual network address information for a virtual network could be embedded in a larger physical packet network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions, or otherwise modifying such data transmissions to translate them from a first networking protocol for which they are configured to a distinct second networking protocol. In other embodiments IPv4 packets could be used. For example, the packet generated by the virtual machine could be fragmented and inserted into an IPv4 packet or be of a smaller size.

In some cases, virtual overlay networks may be established and/or maintained via the operation by one or more communication managers at the edge of one or more intermediate physical networks, such as by configuring and otherwise managing communications for the virtual networks. In particular, groups of one or more computing nodes may each have an associated communication manager module that manages communications to and from those computing nodes. For example, in physical computing system 305a which hosts multiple virtual machine computing nodes 307a, a hypervisor or other virtual machine monitor manager on the physical computing system 305a may provide a virtual machine communication manager 309a for those particular virtual machine computing nodes. Similarly, physical computing systems 305b-d each may have a virtual machine communication manager module 309b-d, respectively. Further, one or more physical computing systems 355a-n may have an associated communication manager module 350 in at least some embodiments, such as provided by a proxy computing device through which communications to and from the physical computing systems 355a-n travel, as provided by a networking device (e.g., a switch, router, hub, etc.) through which communications to and from the physical computing systems travel, etc.

In at least some embodiments, one or more network managers 310 may facilitate configuring communications between computing nodes (e.g., virtual machines 307a-d, physical computing systems 355*a-n*), such as by tracking and/or managing which computing nodes belong to which virtual networks (e.g., based on executing programs on behalf of a customer or other entity), and by providing information about actual physical network addresses that correspond to virtual network addresses used for a particular virtual network (e.g., by a particular customer or other entity). For example, a network manager 310 may receive an indication of a virtual machine on a target physical computing system that is part of one of multiple physical networks. The network manager module 310 then may determine a virtual network with which the virtual machine is to be associated. After determining the virtual network associated with the virtual machine, the network manager module 310 then may initiate a configuration of a virtual machine communication manager module 309*a-d* for the target physical computing system so as to associate the virtual machine with the virtual network.

In embodiments in which an overlay virtual network is implemented and if a communication packet is to be sent between computing nodes in the service provider's network, the originating packet may include an IPv4 address, and a communication manager associated with the sending computing node embeds the virtual network packet into a substrate network packet which includes physical source and destination IP addresses. The communication manager then transmits the packet through the interconnection network 320. A communication manager associated with the receiving computing node receives the substrate packet, extracts the virtual network packet and forwards the virtual network packet on to the targeted computing node.

FIG. 6 also illustrates the use of a network device 366, which in the example of FIG. 1 is a NAT. The NAT 366, at least in part, translates public IP addresses embedded in a packet received from global internet 335 to private IP addresses for routing through interconnection network 320 to the destination virtual machine 107*n*.

A DHCP server 370 also is shown in FIG. 6 and performs much the same functions described above with regard to DHCP server 130. The IP addresses assigned by the DHCP server 130 may be virtual overlay addresses used in the virtual overlay network. In some embodiments, the physical addresses of the virtual machines and compute nodes are statically assigned by the network provider and are not alterable or even visible to the customers. The IP addresses to which customers have awareness are the virtual IP addresses, and the network manager 310 maintains mappings between virtual IP addresses and physical IP addresses. The techniques described above for assigning and moving IP addresses between instances are for the virtual IP addresses of the virtual overlay network. When a customer initiates an API call to move an IP address between instances owned by the customer, in various embodiments it is the virtual IP addresses of the virtual overlay network that are moved, not the respective physical IP addresses.

Figure 7:
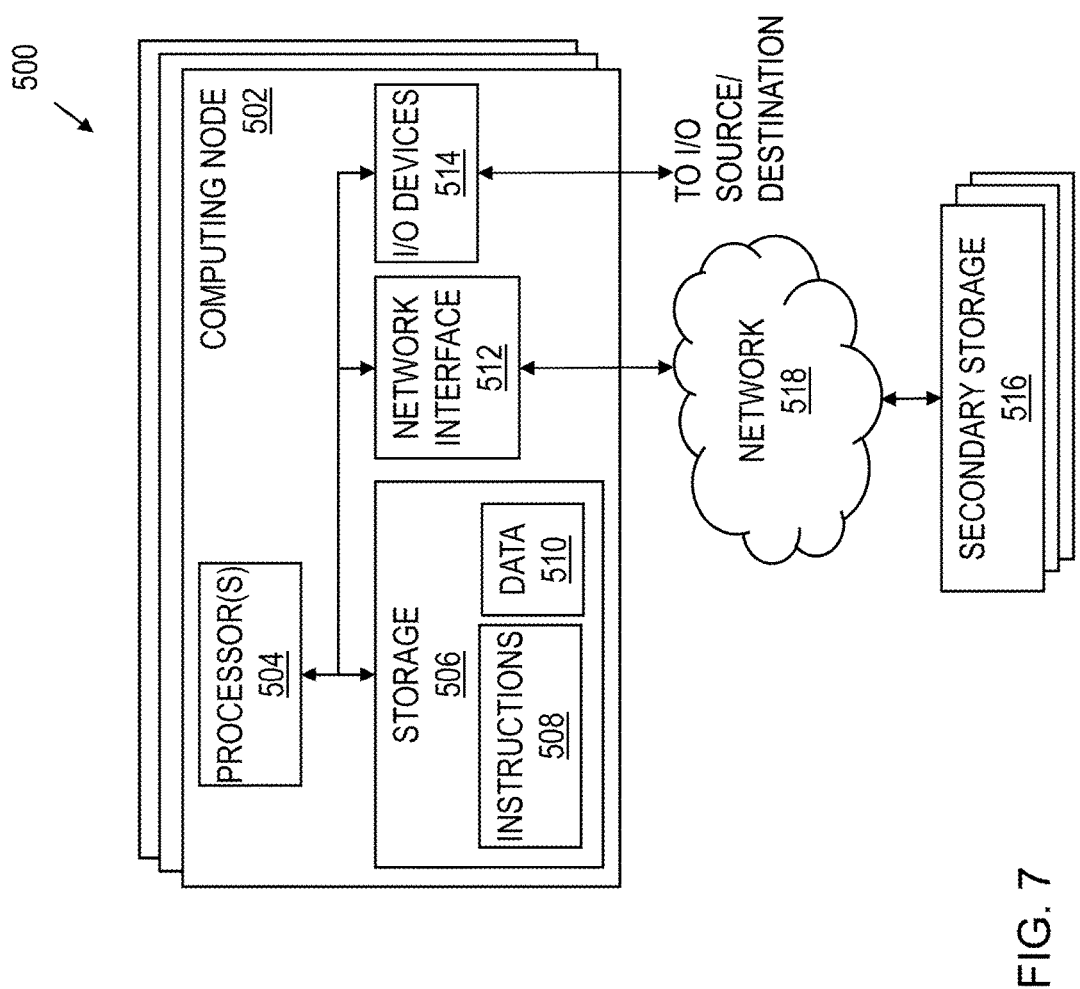
FIG. 7 illustrates an example of an architecture of a computing node usable to implement any of the systems and services described herein in accordance with various embodiments.

FIG. 7 shows a schematic diagram for a computing system 500 suitable for implementation of at least some of the provider network 100, including the functionality of the network managers 120, 310, DHCP servers 130, 370, virtual machine instances and other components as described herein in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the network managers 120, 310, DHCP servers 130, 370, virtual machine instances and other components described herein.

Each computing node 502 includes one or more processors 504 coupled to memory 506, network interface 512, and 110 devices 514. In some embodiments, a computing node 502 may implement the functionality of more than one component of the provider networks. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or NIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the network managers 120, 310, DHCP servers 130, 370, virtual machine instances and other components described herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing nodes 502 via the network 518, A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission media or signals via the network 518, which may be a wired or wireless network or a combination thereof. Each of the resource manager 180 and interface manager 183 may be implemented as a separate computing node 502 executing software to provide the computing node with the functionality described herein. In some embodiments, the network managers 120, 310, DHCP servers 130, 370, virtual machine instances and other components described herein may be implemented by the same computing node.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
one or more computing devices configured to implement a network manager and a dynamic host configuration protocol (DHCP) server system in a provider network;
wherein the network manager is configured to:
store and update mappings of internet protocol (IP) addresses to individual virtual machine instances executing in the provider network; and
receive an application programming interface (API) call from a customer of the provider network to change an IP address from a first virtual machine instance of that customer to a second virtual machine instance of that customer and
update the mapping for the IP address from the first virtual machine instance to the second virtual machine instance; and
wherein the DHCP server system is configured to:
transmit a first DHCP message to the first virtual machine instance that sets a valid-lifetime for the IP address to a minimal time-out value; and
transmit a second DHCP message to the second virtual machine instance that provides the IP address to the second virtual instance with a valid-lifetime greater than the minimal time-out value.

2. The system of claim 1, wherein the DHCP server system is configured to transmit a RECONFIGURE message to the first virtual machine instance and then to transmit the first DHCP message to the first virtual machine after receipt of a REQUEST message from the first virtual machine instance.

3. The system of claim 1, wherein the network manager is configured to:
store mappings between virtual overlay IP addresses of a plurality of virtual networks and corresponding computing devices; and
wherein the IP address whose valid-lifetime is set to the minimal time-out value is a virtual IP address.

4. The system of claim 1, wherein the network manager is configured to cause the new mapping for the IP address from the first virtual machine instance to the second virtual machine instance to be distributed to other network components in the provider network.

5. A system, comprising:
a plurality of computing devices configurable in a provider network, wherein each computing device includes a processor and memory, and wherein one or more of the computing devices is configured to implement a dynamic host configuration protocol (DHCP) server system;
wherein the DHCP server system is configured to move an internet protocol (IP) address from a first virtual machine instance of a customer to a second virtual machine instance of that customer by:
transmission of a first DHCP message to the first virtual machine instance that sets a valid-lifetime for the IP address to less than or equal to 60 seconds; and
transmission of a second DHCP message to the second virtual machine instance that provides the IP address to the second virtual instance with a valid-lifetime greater than 60 seconds.

6. The system of claim 5, wherein one or more of the computing devices is configured to implement a network manager, and wherein the network manager is configured to:
receive an application programming interface (API) call from a customer of the provider network to move the IP address from the first virtual machine instance to the second virtual machine instance; and
transmit a message to the DHCP server to move the IP address.

7. The system of claim 6, wherein the network manager is further configured to:

store mappings of IP addresses to individual virtual machine instances executed in the provider network;

update the mapping for the IP address from the first virtual machine instance to the second virtual machine instance; and provide an updated IP address mapping of the IP address to the second virtual machine instance to network components in the provider network.

8. The system of claim 5, wherein the DHCP server system is configured to:

transmit a RECONFIGURE message to the first virtual machine instance;

transmit the first DHCP message to the first virtual machine after receipt of a REQUEST message from the first virtual machine instance;

transmit a RECONFIGURE message to the second virtual machine instance; and transmit the second DHCP message to the second virtual machine after receipt of a REQUEST message from the second virtual machine instance.

9. The system of claim 5, wherein the network manager is configured to:

store mappings between virtual overlay IP addresses of a plurality of virtual networks and corresponding computing devices; and wherein the IP address whose valid-lifetime is set to less than or equal to 60 is a virtual IP address.

10. The system of claim 5, wherein the first DHCP message includes a plurality of IP addresses assigned to the first virtual machine instance, at least one IP address in the first DHCP message includes the valid life-time of less than or equal to 60 seconds and at least one other IP address includes a valid life-time greater than 60 seconds.

11. The system of claim 10, wherein the second DHCP message includes a plurality of IP addresses assigned to the second virtual machine instance, and wherein the second DHCP message includes a valid life-time greater than 60 seconds for each of the plurality of IP addresses assigned to the second virtual machine instance.

12. The system of claim 5, wherein the network manager is configured to cause an updated mapping of the IP address from the first virtual machine instance to the second virtual machine instance to be transmitted to other network components in the provider network.

13. A computer-implemented method of moving an internet protocol (IP) address from a first virtual machine instance of a customer hosted by a service provider network to a second virtual machine instance of the customer, comprising:

transmitting messages by a server to the first and second virtual machine instances of the customer to indicate a configuration change;

changing a valid lifetime to a minimal time-out value by the server for an IP address previously assigned to the first virtual machine instance; and assigning the IP address by the server to the second virtual machine instance with a valid life-time greater than the minimal time-out value.

14. The method of claim 13, further comprising receiving a request from a customer of the service provider network to move the IP address from the first virtual machine instance to the second virtual machine instance.

15. The method of claim 14, wherein the request includes an application programming interface (API) call.

16. The method of claim 13, wherein the messages to indicate a configuration change are dynamic host configuration protocol version 6 (DHCPv6) REQUEST messages, and wherein the first and second messages are DHCPv6 REPLY messages.

17. The method of claim 13, further comprising:

storing mappings of IP addresses to individual virtual machine instances executed in the provider network;

updating the mapping for the IP address from the first virtual machine instance to the second virtual machine instance; and providing an updated IP address mapping of the IP address for the second virtual machine instance to network components in the service provider network.

18. The method of claim 13, further comprising:

implementing a virtual overlay network over a physical network within the service provider network; and wherein the IP address is a virtual overlay IP address used in the virtual overlay network.

19. The method of claim 13, wherein changing the valid lifetime to the minimal time-out value for an IP address previously assigned to the first virtual machine instance includes transmitting a message that includes a plurality of IP addresses assigned to the first virtual machine instance, at least one IP address in the first message includes the valid life-time of the minimal time-out value and at least one other IP address includes a valid life-time greater than the minimal time-out value.

20. The method of claim 19, wherein assigning the IP address by the server to the second virtual machine instance with a valid life-time greater than the minimal time-out value includes transmitting a message that includes a plurality of IP addresses assigned to the second virtual machine instance and a valid life-time greater than the minimal time-out value for each of the plurality of IP addresses assigned to the second virtual machine instance.

* * * * *